Oct. 13, 1936.  G. ROJO  2,057,595
FISHING APPLIANCE
Filed Jan. 24, 1936
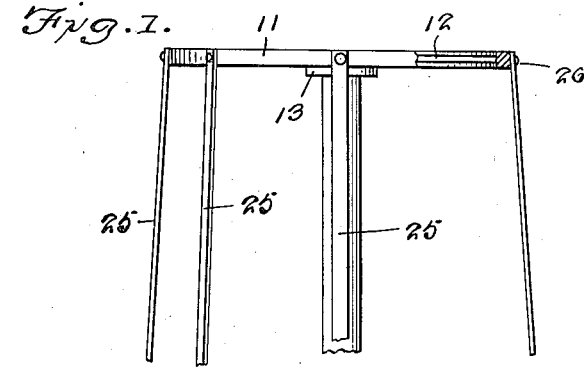
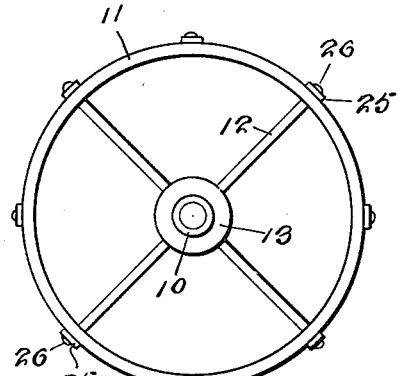
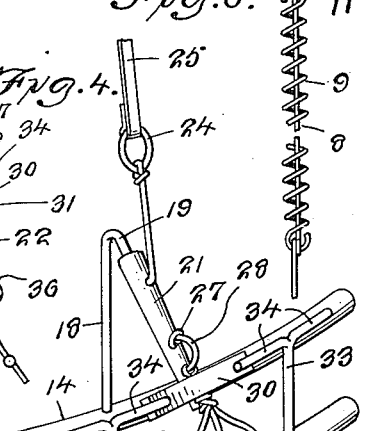
Guadalupe Rojo
INVENTOR
BY Victor J. Evans & Co.
ATTORNEY Patented Oct. 13, 1936

2,057,595

UNITED STATES PATENT OFFICE 2,057,595

FISHING APPLIANCE

Guadalupe Rojo, Alton, Ill.

Application January 24, 1936, Serial No. 60,695

5 Claims. (Cl. 43—4)

This invention relates to fishing appliances and has for an object to provide a device of this character having yieldably held means adapted to be tripped by the fish striking the bait and immediately permitting a tension device such as a spring or rubber band to contract and impale the fish on the hook.

A further object is to provide a device of this character which will be easy to set, may be used in deep or shallow water or on the surface, will be positive in action, will be formed of a few strong, simple, and durable parts, which will be easy to manufacture and will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a side elevation of a fishing appliance constructed in accordance with the invention.

Figure 2 is a cross sectional view taken on the line 2—2 of Figure 1.

Figure 3 is a plan view of the upper ring to which the contractile members are secured.

Figure 4 is a detail perspective view of the trigger and trigger controlling devices in set position.

Figure 5 is a fragmentary cross section of the trigger device.

Figure 6 is a detail view of a helical spring contractile member.

Referring now to the drawing in which like characters of reference designate similar parts in the various views, 10 designates a supporting rod to the upper end of which is secured a ring 11 having spokes 12 radiating from a hub 13 which is rigidly secured to the rod 10 in any suitable manner. A pair of concentric rings 14 and 15 are provided with common spokes 16 which radiate from a hub 17 which is fixed in any preferred manner to the rod 10 below the upper ring 11.

The inner bottom ring 14 is provided with a plurality of upstanding hooks 18, the bills 19 of which are directed downwardly and outwardly toward the outer ring 15. The bill of each hook is adapted to enter a socket 20 in an associated trigger 21, as shown in Figure 5. A fish line 22 is looped through spaced openings 23 in the trigger and one end of the fish line is secured to an eye 24 on the lower end of a contractile member 25, the upper end of which is fixed to the upper ring 11, as shown at 26. The contractile member 25 may be a rubber band or a helical spring, the present embodiment illustrating a rubber band in Figure 1 and a helical spring 9 in Figure 6 limited in expanding movement by a cord 8 disposed axially in the spring.

The fish line 22 is knotted, as shown at 27 in Figure 5, so that the pull of the contractile member 25 will not pull or dislodge the fish line from the trigger 21, and beyond the knot is formed with slack 28 and then is passed through an opening 29 in a catch 30. The fish line is knotted, as shown at 31, near each edge of the catch so that it may not be pulled through the catch by either the pull of the contractile member or by the pull of the fish when striking the bait on the hook 32.

The outer bottom ring 15 is provided with a plurality of T-shaped stops 33 and these stops are disposed sufficiently close together so that the confronting arms 34 of adjacent stops will overlap the ends of the associated catch 30, as best shown in Figure 4.

To set the appliance after the hooks have been baited it is merely necessary to pull down upon the trigger 21 against the tension of the associated contractile member 25 and insert the bill 19 of the associated hook 18 in the socket 20 in the trigger. The trigger is manually held in this position until the associated catch 30 is placed transversely across the top face of the trigger near the free end thereof and the ends of the catch are carefully disposed underneath the confronting arms 34 of the adjoining stops 33.

When a fish strikes the bait or even takes the bait gently there will be sufficient movement of the fish line to pull the catch 30 from underneath the arms 34 whereupon the trigger is freed and the contractile member 25 immediately and sharply dislodges the trigger from the bill 19 of the associated hook and imparts a quick jerk of the fish line to impale the fish on the hook.

Although only eight sets of contractile members and their associated triggers and fish lines are illustrated, any desired number of these parts may be used. Although each fish line 22 is illustrated as being equipped with three auxiliary fish lines 35, it will be understood that any desired number of auxiliary fish lines and hooks therefor may be used. The auxiliary and the main fish lines pass through guide openings 36 in the outer lower ring 15.

From the above description it is thought that the construction and operation of the invention will be fully understood without further explanation.

What is claimed is:

1. Fishing apparatus comprising supporting rings, a fish line terminating in a hook, tension means secured to one of the rings, means on the other ring secured to the fish line and holding the tension means under tension, and means for releasing the first named means by the pull of a fish upon the fish line to permit the tension means to jerk the fish line and impale the fish upon the hook.

2. Fishing apparatus comprising superposed supporting rings, a fish line terminating in a hook, a tension member secured at the upper end to the upper ring, a trigger on the lower ring secured to the fish line and to the lower end of the tension member, and a latch on the lower ring holding the trigger set and moved by the pull of a fish upon the fish line to release the trigger and permit the tension member to jerk the fish line and impale the fish upon the hook.

3. Fishing apparatus comprising a post, an upper ring on the post, concentric lower rings on the post, a fish line terminating in a hook, a rubber band secured to the upper ring, a trigger on one of the lower rings secured to the fish line and to the rubber band and holding the rubber band tensioned, and a latch on the other lower ring adapted to hold the trigger set and adapted to be dislodged by the pull of a fish upon the fish line to release the trigger and permit the rubber band to jerk the fish line and impale the fish upon the hook.

4. Fishing apparatus comprising a post, concentric rings on the post, a fish line terminating in a hook, an upright hook on one of the rings terminating in a downwardly extending bill, a trigger secured to the fish line, a rubber band operatively connected to the post and to the trigger, the trigger having a socket in one end engageable with said bill to hold the rubber band tensioned, a latch loosely mounted on the trigger and connected to the fish line, and stop means engaged over the latch for holding the trigger set, said latch being adapted to be dislodged from said stop means by the pull of a fish upon the fish line to release the trigger from said bill and permit the rubber band to contract and jerk the fish line to impale the fish upon the hook.

5. Fishing apparatus comprising a post, concentric rings on the post, a fish line terminating in a hook, an upright hook on one of the rings terminating in a downwardly extending bill, a trigger secured to the fish line, a rubber band operatively connected to the post and to the trigger, the trigger having a socket in one end engageable with said bill to hold the rubber band tensioned, a latch loosely mounted on the trigger and connected to the fish line, and a stop on one of the rings having a lateral arm engaged over the latch, said latch being adapted to be dislodged from said stop arm by the pull of a fish upon the fish line to release the trigger from said bill and permit the rubber band to contract and jerk the fish line to impale the fish upon the hook.

GUADALUPE ROJO.